United States Patent
Celik et al.

(10) Patent No.: US 11,588,360 B2
(45) Date of Patent: Feb. 21, 2023

(54) BRUSHLESS MOTOR AND STATOR THEREFOR

(71) Applicant: Dyson Technology Limited, Wiltshire (GB)

(72) Inventors: Tuncay Celik, Swindon (GB); David George Warne, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 330 days.

(21) Appl. No.: 16/011,823

(22) Filed: Jun. 19, 2018

(65) Prior Publication Data

US 2018/0366996 A1    Dec. 20, 2018

(51) Int. Cl.
| | |
|---|---|
| H02K 1/14 | (2006.01) |
| H02K 1/17 | (2006.01) |
| H02K 15/02 | (2006.01) |
| H02K 1/18 | (2006.01) |

(52) U.S. Cl.
CPC .............. H02K 1/141 (2013.01); H02K 1/17 (2013.01); H02K 1/148 (2013.01); H02K 1/185 (2013.01); H02K 15/022 (2013.01); H02K 2213/12 (2013.01)

(58) Field of Classification Search
CPC ........ H02K 15/022; H02K 1/141; H02K 1/17; H02K 1/185; H02K 2213/12; H02K 1/148
See application file for complete search history.

(56) References Cited

U.S. PATENT DOCUMENTS

| | | | |
|---|---|---|---|
| 2,903,610 A | 9/1959 | Bessiere | |
| 4,340,830 A * | 7/1982 | Hoyer-Ellefsen | H02K 15/16 310/89 |
| 4,433,472 A | 2/1984 | Andoh et al. | |
| 5,196,749 A | 3/1993 | Palma et al. | |
| 5,365,137 A | 11/1994 | Richardson et al. | |
| 5,757,108 A | 5/1998 | Suzuki | |
| 5,859,486 A | 1/1999 | Nakahara et al. | |
| 6,359,360 B1 | 3/2002 | Lungu | |
| 6,452,303 B1 * | 9/2002 | Marioni | H02K 1/148 310/254.1 |

(Continued)

FOREIGN PATENT DOCUMENTS

| | | |
|---|---|---|
| CN | 103107669 | 5/2013 |
| DE | 86 19 140 | 11/1987 |

(Continued)

OTHER PUBLICATIONS

Kenichi, electric blower and electric cleaner using the same, JP 2012202283. (Year: 2012).*

(Continued)

*Primary Examiner* — Gary A Nash
(74) *Attorney, Agent, or Firm* — Faegre Drinker Biddle & Reath LLP

(57) ABSTRACT

A brushless motor comprising a frame; a rotor assembly comprising a shaft, a rotor core and a bearing assembly, the bearing assembly being mounted to the frame; and at least one stator comprising a C-shaped stator core, the stator core comprising a back and first and second arms, wherein at least one of the first and second arms includes a protrusion that contacts the frame so as to inhibit radial movement of the stator core towards the rotor assembly.

17 Claims, 3 Drawing Sheets

(56) References Cited

U.S. PATENT DOCUMENTS

| | | | |
|---|---|---|---|
| 6,724,117 | B1 | 4/2004 | Lungu |
| 7,669,311 | B2 | 3/2010 | Ionel et al. |
| 7,965,014 | B2 | 6/2011 | Shinagawa et al. |
| 2006/0071565 | A1* | 4/2006 | Stewart .................. H02K 1/148 |
| | | | 310/89 |
| 2011/0043067 | A1 | 2/2011 | Li et al. |
| 2013/0221781 | A1 | 8/2013 | Nakayama et al. |
| 2013/0270948 | A1 | 10/2013 | Unterfrauner |
| 2014/0021809 | A1 | 1/2014 | Burress et al. |
| 2017/0170697 | A1 | 6/2017 | Locke et al. |
| 2017/0231451 | A1* | 8/2017 | Oshikiri .................. H02K 7/14 |
| | | | 15/347 |
| 2017/0279331 | A1 | 9/2017 | Li et al. |
| 2017/0358965 | A1* | 12/2017 | Pithwa .................. H02K 1/148 |

FOREIGN PATENT DOCUMENTS

| | | |
|---|---|---|
| DE | 39 06 368 | 9/1989 |
| DE | 41 01 666 | 11/1991 |
| DE | 10 2011 052 131 | 1/2013 |
| EP | 0 793 332 | 9/1997 |
| EP | 2 144 348 | 1/2010 |
| GB | 258981 | 10/1926 |
| GB | 1 453 861 | 10/1976 |
| GB | 1 515 882 | 6/1978 |
| GB | 2 500 580 | 10/2013 |
| GB | 2545268 | 6/2017 |
| JP | 54-82608 | 7/1979 |
| JP | 55-10315 | 1/1980 |
| JP | 55-92557 | 7/1980 |
| JP | 2008-114787 | 5/2008 |
| JP | 2012-110174 A | 6/2012 |
| JP | 2017-108578 | 6/2017 |
| KR | 10-0902563 | 6/2009 |
| WO | 00/57541 | 9/2000 |
| WO | WO-2012131776 A1 * | 10/2012 ............ H02K 11/33 |
| WO | 2017/098202 | 6/2017 |

OTHER PUBLICATIONS

International Search Report and Written Opinion dated Aug. 14, 2018, directed to International Application No. PCT/GB2018/051128; 19 pages.

Search Report dated Dec. 11, 2017, directed to GB Application No. 1709832.8; 2 pages.

Notification of Reason for Rejection dated Jun. 3, 2019, directed to JP Application No. 2018-116739; 6 pages.

The Third Office Action dated Feb. 19, 2021, directed to JP Application No. 201810608166.X; 17 pages.

Reconsideration Report dated Oct. 26, 2020, directed to JP Application No. 2018-116739; 9 pages.

The First Office Action dated Nov. 22, 2019, directed to CN Application No. 201810608166.X; 14 pages.

Office Action received for Korean Patent Application No. 10-2020-7000332, dated Jun. 7, 2021, 9 pages (5 pages of English Translation and 4 pages of Original Document).

\* cited by examiner

BRUSHLESS MOTOR AND STATOR THEREFOR

REFERENCE TO RELATED APPLICATIONS

This application claims the priority of United Kingdom Application No. 1709832.8, filed Jun. 20, 2017, the entire contents of which are incorporated herein by reference.

FIELD OF THE INVENTION

Embodiments of the present invention relate to brushless motors, and in particular stators within brushless motors.

BACKGROUND OF THE INVENTION

There is a general desire to improve electric motors in a number of ways. In particular, improvements may be desired in terms of size, weight, manufacturing cost, efficiency, reliability and noise.

SUMMARY OF THE INVENTION

According to a first aspect, there is provided brushless motor comprising a frame; a rotor assembly comprising a shaft, a rotor core and a bearing assembly, the bearing assembly being mounted to the frame; and at least one stator comprising a C-shaped stator core, the stator core comprising a back and first and second arms, wherein at least one of the first and second arms includes a protrusion that contacts the frame so as to inhibit radial movement of the stator core towards the rotor assembly.

By mounting the bearing assembly on the frame, and also locating the radial position of the stator core through contact with the frame, the radial location of the stator core relative to the rotor core magnet can be tightly controlled as there are few components between the stator core and rotor assembly that can have size tolerances. As a result, the clearance or air gap between stator core pole tips and the rotor core magnet can be made small, improving the performance and efficiency of the motor, and thus leading to an improved brushless motor.

In some embodiments, the frame is shaped so as to allow the at least one stator to slide radially towards the rotor assembly until the protrusion contacts the frame. This leads to simple assembly of the motor. For example, the frame may include a slot into which at least a portion of the stator is inserted, and the protrusion contacts at least one edge of the slot. The stator including the stator core can therefore simply be inserted into the slot until the protrusion on the stator core contacts the frame, at which point the stator may be in its final radial position. The frame may include a plurality of slots, and at least a portion of a respective one of a plurality of stators can be inserted into each slot. Thus a motor including multiple stators can be simply assembled by insertion of the stators into their respective slots.

The rotor assembly may include an impeller, and the frame may include an impeller shroud. Therefore, the location of the impeller relative to the impeller shroud can also be tightly controlled, as there are few components between the shroud and the impeller that can have size tolerances. As a result, the clearance between the rotor and impeller shroud may be made smaller. Additionally or alternatively the concentricity of the shroud can be improved, that is, the shroud may be more concentric with the rotation axis of the rotor assembly, and hence the clearance between the rotor and the impeller may be smaller.

In some embodiments, the bearing assembly comprises a pair of bearings mounted either side of the rotor core on the shaft. Therefore, the rotor assembly may be held securely within the frame and vibrations may be reduced compared to an arrangement whereby the bearings are closer together, such as the same axial side of the rotor core.

In some embodiments, the stator core comprises a plurality of layers or laminations held together by a weld located within or adjacent to the at least one protrusion. By locating the weld within or adjacent to the protrusion, the weld can be located within a region of lesser magnetic flux when the motor is operating compared to other regions within the stator core. Therefore, while the weld may increase electrical conductivity between the layers of the stator core, the impact of the weld may be reduced compared to a weld located within other regions of the stator core. For example, eddy currents induced within the stator core can be reduced.

In some embodiments, each arm of the stator core includes a respective protrusion, each protrusion contacts the frame, and the stator core comprises a plurality of layers or laminations held together by a respective weld located within each of the protrusions. Therefore, for example, protrusions on both first and second arms of the stator core contact the frame. As such, the stator remains securely and reliably in position because of multiple points, regions or lines of contact between the stator and frame.

The protrusion may extend along the axial length of the stator core. Therefore, the stator can be securely and reliably positioned through contact with the frame, such as through contact with elongate edges of a slot into which the stator is inserted. Furthermore, if the stator core is formed of multiple layers or laminations, and means for securing the laminations together such as a weld is located within or adjacent to the protrusion, then all of the laminations can be secured together in this manner.

The stator may include a bobbin and a winding wound round the back of the stator core. The stator comprising the core, bobbin and winding may therefore be assembled into the motor as a complete unit, thereby simplifying assembly of the motor. For example, the stator may be inserted into a slot in the frame as a complete unit. Multiple stators may be inserted into respective slots in this manner.

Each arm of the stator core may comprise a straight section that extends from the back to a respective pole tip. This may simplify assembly of the stator into the motor. The protrusion may be located on the straight section of one of the arms, or in embodiments with multiple protrusions, a respective protrusion may be located on the straight section of each of the arms.

According to a second aspect, there is provided a C-shaped stator core for a brushless motor, the stator core comprising a back and first and second arms, at least one of the first and second arms including a protrusion, wherein the stator core is formed of a plurality of layers, the layers held together by a weld located within or adjacent to the protrusion.

In some embodiments, each arm of the stator core includes a respective protrusion, and the stator core comprises a plurality of layers or laminations held together by a respective weld located within each of the protrusions. As such, the layers of the stator core may be held together in a secure manner by multiple welds.

The protrusion may extend along the axial length of the stator core. Therefore, all of the layers of the stator core may be secured together by the weld, for example where each layer is generally perpendicular to the axis of rotation of the rotor assembly.

According to a third aspect, there is provided a brushless motor comprising a frame; a rotor assembly comprising a shaft, a rotor core and a bearing assembly, the bearing assembly being mounted to the frame; and at least one stator comprising a C-shaped stator core according to the second aspect.

BRIEF DESCRIPTION OF THE DRAWINGS

Embodiments of the invention will now be described by way of example only with reference to the accompanying drawings, in which.

DETAILED DESCRIPTION OF THE INVENTION

Figure 1:
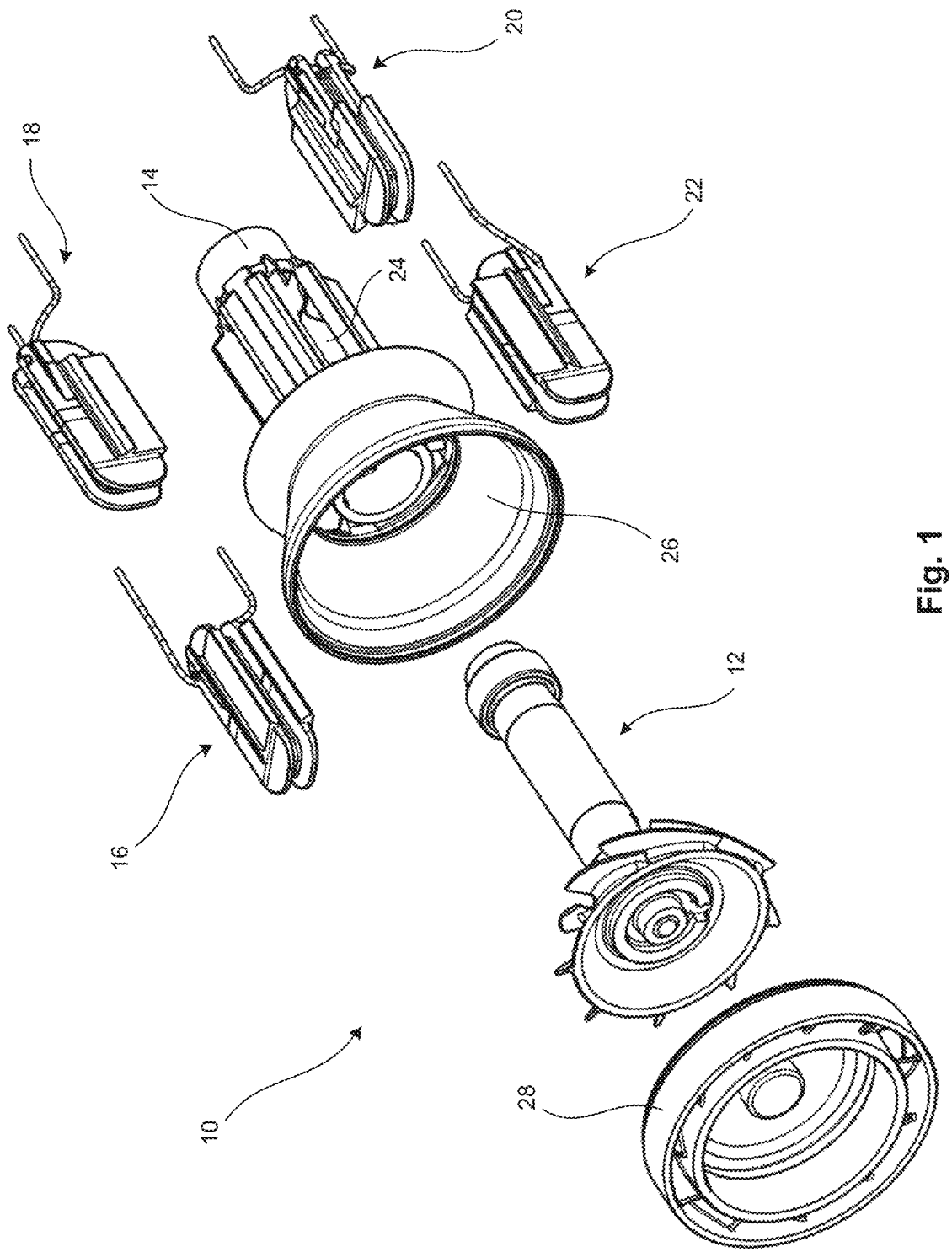
FIG. 1 shows an exploded perspective view of a motor according to embodiments of the invention.
Figure 4:
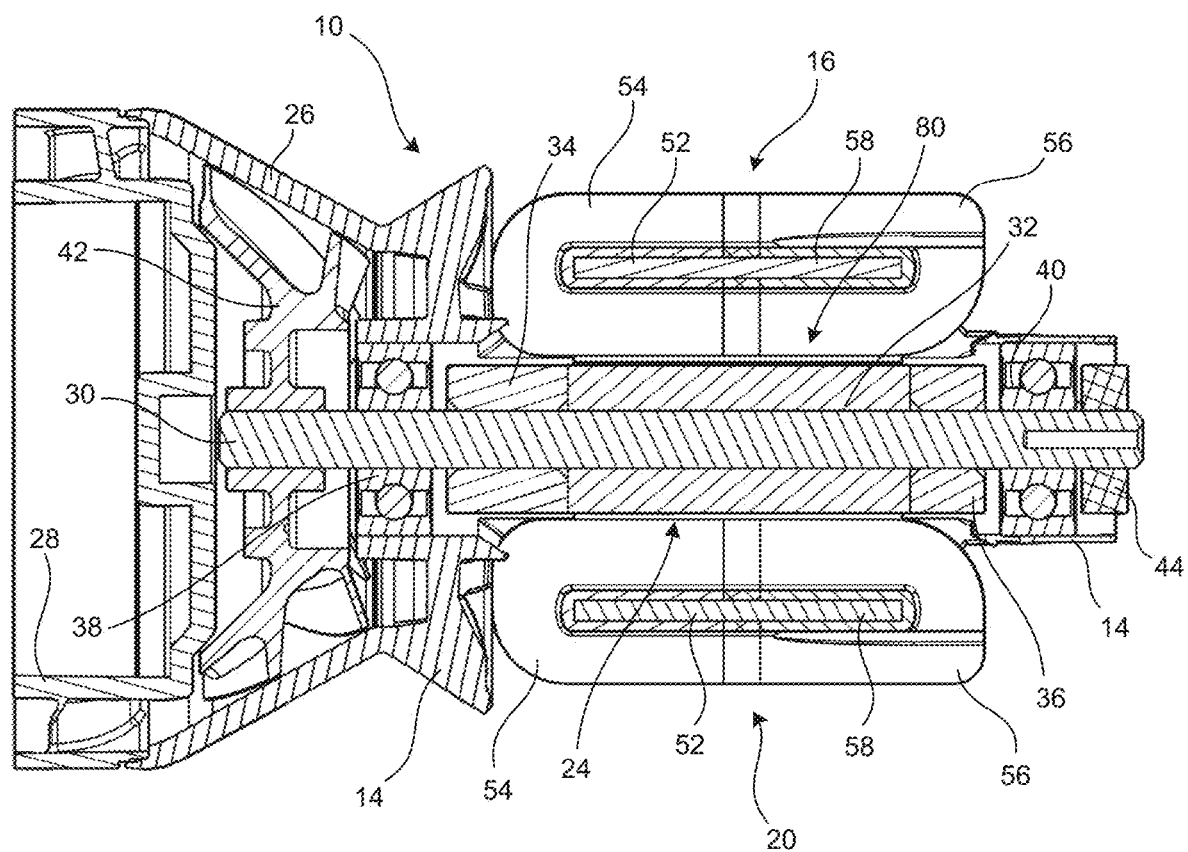
FIG. 4 shows a cross-section of a motor according to embodiments of the invention.

FIG. 1 shows an exploded perspective view of a motor 10 according to an embodiment of the invention. Certain components, such as control electronics and an external housing, are not shown for clarity. The motor 10 includes a rotor assembly 12, a frame 14 and four stator assemblies 16, 18, 20 and 22. When the motor 10 is assembled, the rotor assembly 12 is located within and mounted to the frame 14, and the stator assemblies are located in respective slots in the frame 14. For example, the stator assembly 20 is located within slot 24 in the frame. The frame 14 may be a one-piece construction, for example moulded as a single object, and includes an impeller shroud 26 that covers the impeller as shown in FIG. 4. The motor 10 also includes a diffuser 28.

Figure 2:
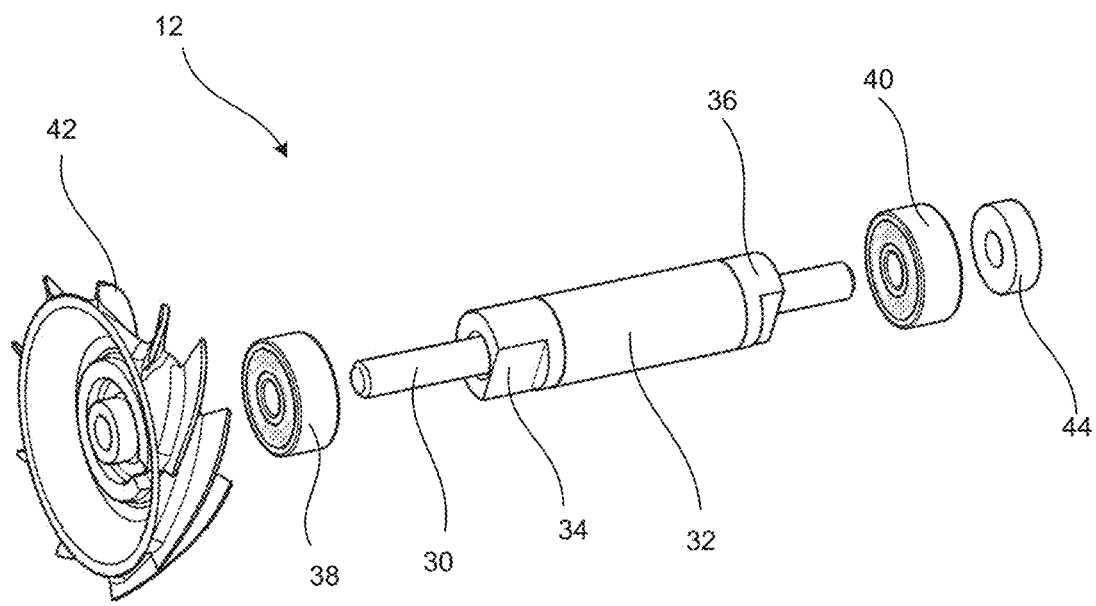
FIG. 2 shows an exploded perspective view of a rotor assembly.

FIG. 2 shows an exploded perspective view of the rotor assembly 12. The rotor assembly 12 comprises a shaft 30 on which is mounted a rotor core permanent magnet 32, a first balancing ring 34 and a second balancing ring 36. When the rotor assembly 12 is assembled, a pair of bearings 38, 40 are mounted on the shaft 30 on either side of the core 32 and balancing rings 34, 36. An impeller is 42 is mounted at one end of the shaft 30, and a sensor magnet 44 is mounted at the other end.

Figure 3:
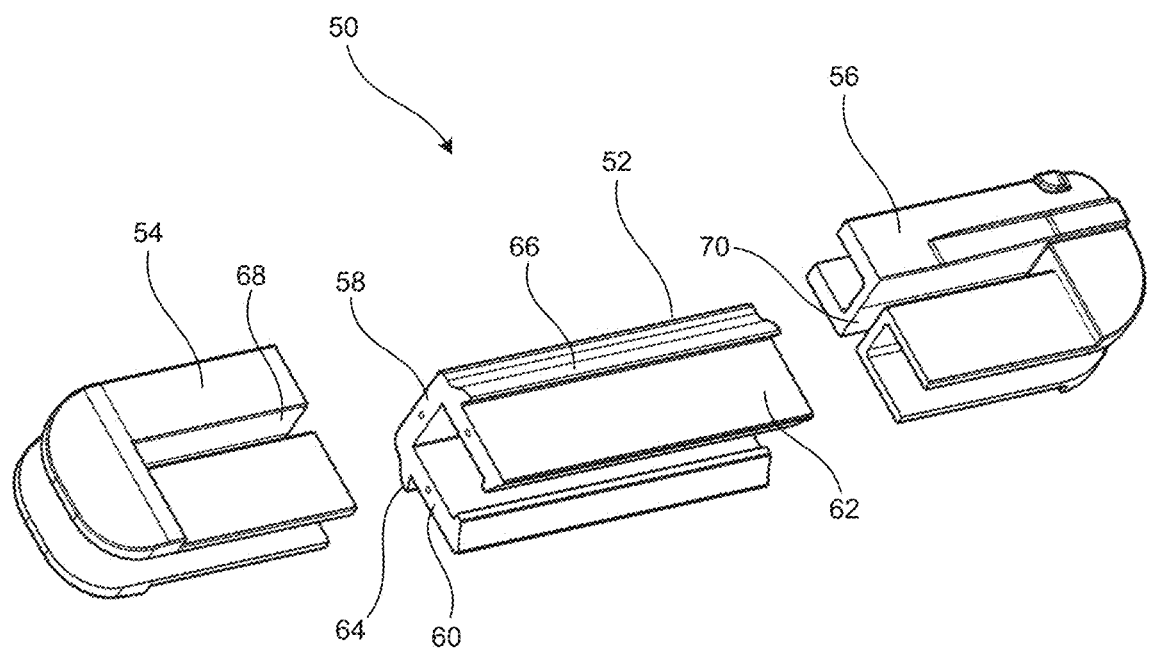
FIG. 3 shows an exploded perspective view of a stator according to embodiments of the invention.

FIG. 3 shows an exploded perspective view of a stator assembly 50. The stator assembly 50 may be any one of the stator assemblies 16, 18, 20, 22 shown in FIG. 1. The stator assembly 50 comprises a C-shaped stator core 52, a first C-shaped bobbin portion 54 and a second C-shaped bobbin portion 56.

The stator core 52 comprises a back 58, a first arm 60 and a second arm 62. Each of the arms 60, 62 includes a respective protrusion 64, 66 on the outer surface of the stator core 52. The protrusions 64, 66 extend along the axial length of the stator.

Figure 5:
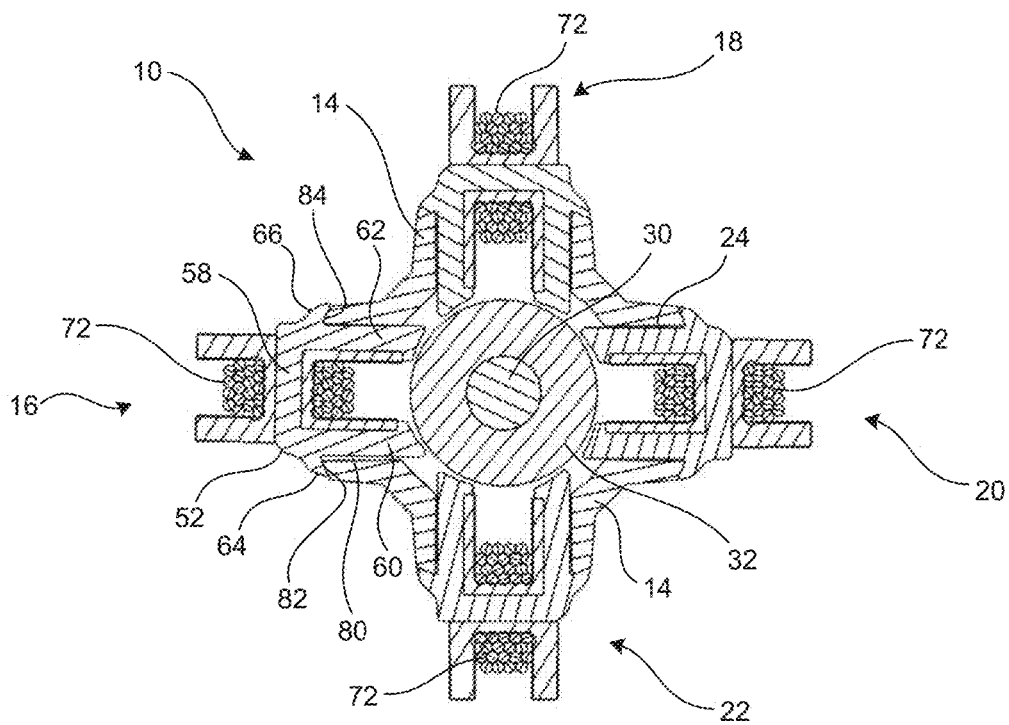
FIG. 5 shows a cross-section of a motor according to embodiments of the invention.

The first bobbin portion 54 includes arms that define a first slot 68. Similarly, the second bobbin portion 56 includes arms that define a second slot 70. The bobbin portions 54, 56 slide onto the stator core 52 such that, when assembled, the slots 68, 70 accommodate the back 58 of the stator core 52 as shown in FIGS. 1, 4 and 5. The bobbin portions 54, 56 have a generally H-shaped cross-section such that a stator winding (not shown) may be wound around the bobbin portions in the assembled stator assembly, and hence around the back 58 of the stator core 52.

The stator core 52 has a laminated construction comprising a plurality of layers that are generally orthogonal to the rotation axis of the rotor assembly 12. The layers of the stator core 52 may be held together by welding. More specifically, the layers of the stator core 52 are held together by a weld that has been applied to the protrusions 64, 66 from the arms 60, 62 of the stator core 52. As a result, while the weld may increase the electrical conductivity between the layers, the location of the weld in the protrusions 64, 66 ensures that the weld is located in a region of lesser magnetic flux in the stator core 52 than if the weld is located within the back 58 or arms 60, 62 of the stator core 52. As a result, the impact of using a weld to hold the layers together is reduced.

FIG. 4 shows a cross-section of the assembled motor 10 through a plane that includes the axis of rotation of the rotor assembly 12. It can be seen that the bearings 38, 40 of the rotor assembly 12 are mounted directly to and within the frame 14. The stator assemblies 16, 20 are also shown inserted into their respective slots in the frame 14. It can be seen that on each stator assembly, the bobbin portions 54, 56 enclose the back 58 of the stator core 52.

FIG. 5 shows a cross-section of the assembled motor 10 through a plane that is perpendicular to the axis of rotation of the rotor assembly 12. The stator assemblies 16, 18, 20, 22 are shown including their respective windings 72. The stator assemblies 16, 18, 20, 22 are shown inserted into their respective slots in the frame 14. For example, stator assembly 16 is inserted into slot 80, whereas stator assembly 20 is shown inserted into slot 24.

The stator assemblies are inserted into their slots until the projections 64, 66 on the arms 60, 62 of the stator core 52 contact respective surfaces of the frame 14. For example, the projections 64, 66 of the stator core 52 of stator assembly 16 contact end surfaces 82, 84 respectively of the slot 80 in the frame 14. As a result, during assembly of the motor 10, each stator assembly may be inserted into its respective slot and slid in a radial direction towards the rotor assembly until the projections contact an appropriate part of the frame 14, such as the edges of the slot. For example, the stator 16 is shown in its fully inserted position, such that the projections 64, 66 contact the edges 82, 84 of the slot 80. The other stator portions 18, 20 and 22 may be inserted into their respective slots in a similar manner.

At this point, further insertion of the stator assembly into the slot is inhibited, and hence further radial movement of the stator assembly into the slot towards the rotor assembly 12 is inhibited. When the stator assemblies 16, 18, 20, 22 have been inserted fully into their respective slots, the stator assemblies may be fixed in position. For example, an adhesive may be applied to the region where the projections 64 and/or 66 contact the frame 14 to prevent further movement of the stator assemblies relative to the frame 14.

Therefore, in the assembled motor 10, the radial position of the stator cores 52 is set based on contact between the stator assemblies and the frame 14. In addition, the radial position of the rotor assembly 12 is set based on contact between the rotor assembly 12 and the frame 14. As a result, the clearance between the pole tips of the stator cores 52 and the rotor core 32 of the rotor assembly 12 is tightly controlled as it depends on tolerances of few components. The clearance can therefore be made smaller without the risk of the stator core pole tips contacting the rotor core 32.

What is claimed is:

1. A brushless motor comprising:
   a frame, wherein the frame is molded as a single object and includes an impeller shroud;
   a rotor assembly comprising a shaft, a rotor core and a bearing assembly, the bearing assembly being mounted to the frame, the bearing assembly and the frame cooperating to define a radial position of the rotor assembly within the frame; and
   at least one stator comprising a C-shaped stator core, the stator core comprising a back and first and second arms;
   wherein at least one of the first and second arms includes a protrusion, the frame and the protrusion cooperating to define a radial position of the at least one stator relative to the frame to inhibit radial movement of the stator core towards the rotor assembly.

2. The brushless motor of claim 1, wherein the frame is shaped so as to allow the at least one stator to slide radially towards the rotor assembly until the protrusion contacts the frame.

3. The brushless motor of claim 2, wherein the frame includes a slot into which at least a portion of the stator is inserted, and the protrusion contacts at least one edge of the slot.

4. The brushless motor of claim 3, wherein the frame includes a plurality of slots, and at least a portion of a respective one of a plurality of stators is inserted into each slot.

5. The brushless motor of claim 1, wherein the rotor assembly includes an impeller.

6. The brushless motor of claim 1, wherein the bearing assembly comprises a pair of bearings mounted to either side of the rotor core on the shaft.

7. The brushless motor of claim 1, wherein the stator core comprises a plurality of layers or laminations held together by a weld located within or adjacent to the at least one protrusion.

8. The brushless motor of claim 1, wherein each arm of the stator core includes a respective protrusion, each protrusion contacts the frame, and the stator core comprises a plurality of layers or laminations held together by a respective weld located within or adjacent to each of the protrusions.

9. The brushless motor of claim 1, wherein the protrusion extends along the axial length of the stator core.

10. The brushless motor of claim 1, wherein the stator includes a bobbin and a winding wound round the back of the stator core.

11. The brushless motor of claim 1, wherein each arm of the stator core comprises a straight section that extends from the back to a respective pole tip.

12. The brushless motor of claim 1, wherein the frame is sized and shaped to maintain a clearance between the stator core and the rotor core, the rotor core positioned in an interior of the frame along an axial direction and the stator core positioned relative to the frame along a radial direction.

13. The brushless motor of claim 12, wherein at least a part of the stator core is external to the frame.

14. A C-shaped stator core for a brushless motor, the stator core comprising a back and first and second arms, at least one of the first and second arms including a protrusion, wherein the stator core is formed of a plurality of layers, the layers held together by a weld located within or adjacent to the protrusion, and wherein the protrusion of the C-shaped stator core cooperates with a frame to control a clearance between the stator core and a rotor assembly of the brushless motor defined at least in part by a bearing assembly of the rotor assembly.

15. The stator core of claim 14, wherein each arm of the stator core includes a respective protrusion, and the stator core comprises a plurality of layers or laminations held together by a respective weld located within each of the protrusions.

16. The stator core of claim 14, wherein the protrusion extends along the axial length of the stator core.

17. A brushless motor comprising:
    a frame, wherein the frame is molded as a single object and includes an impeller shroud;
    a rotor assembly comprising a shaft, a rotor core and a bearing assembly, the bearing assembly being mounted to the frame and defining a radial position of the rotor assembly within the frame; and
    at least one stator comprising a C-shaped stator core, wherein the C-shaped stator core includes a back and first and second arms, at least one of the first and second arms including a protrusion that cooperates with the frame to position the at least one stator relative to the rotor core, wherein the stator core is formed of a plurality of layers, the layers held together by a weld located within or adjacent to the protrusion.

* * * * *

UNITED STATES PATENT AND TRADEMARK OFFICE
CERTIFICATE OF CORRECTION

PATENT NO. : 11,588,360 B2
APPLICATION NO. : 16/011823
DATED : February 21, 2023
INVENTOR(S) : Tuncay Celik et al.

Page 1 of 1

It is certified that error appears in the above-identified patent and that said Letters Patent is hereby corrected as shown below:

On the Title Page

In Item (30) "Foreign Application Priority Data" on the front page of the above-identified patent, insert:
--Jun. 20, 2017 (GB)...........1709832--

Signed and Sealed this
Twenty-fifth Day of July, 2023

Katherine Kelly Vidal
*Director of the United States Patent and Trademark Office*